United States Patent [19]

Franco-Ferreira et al.

[11] Patent Number: 4,547,653
[45] Date of Patent: Oct. 15, 1985

[54] SEAM TRACKER

[75] Inventors: Edgard A. Franco-Ferreira, Leucadia, Calif.; William J. Toohey, Pittsford, N.Y.

[73] Assignee: Larry Russell, El Toro, Calif.

[21] Appl. No.: 582,745

[22] Filed: Feb. 23, 1984

[51] Int. Cl.⁴ ............................................... B23K 9/12
[52] U.S. Cl. ............................. 219/124.34; 318/575; 228/45
[58] Field of Search ..................... 219/124.34, 124.22; 318/575, 576, 578; 228/45; 200/61.41

[56] References Cited

U.S. PATENT DOCUMENTS

| 3,171,012 | 2/1965 | Morehead | 219/124.34 |
| 3,408,475 | 10/1968 | Fier | 219/124.34 |
| 3,457,484 | 7/1969 | Shimizu et al. | 318/578 |
| 3,997,757 | 12/1967 | Cecil et al. | 219/124.34 |
| 4,151,394 | 4/1979 | Cecil | 219/124.34 |

FOREIGN PATENT DOCUMENTS

| 55-36056 | 3/1980 | Japan | 219/124.34 |
| 799923 | 1/1981 | U.S.S.R. | 219/124.34 |

Primary Examiner—Clifford C. Shaw
Attorney, Agent, or Firm—Jackson & Jones

[57] ABSTRACT

A seam tracker in which a shaft containing a position-indicator-member, e.g., a ferromagnetic portion, is attached to a probe, and is mounted on a ball joint and the ball joint is mounted on a pin the ends of which extend through slots in a housing. Spring means urge the pin ends against one end of the respective slots. A mechanical-null-position spring urges the shaft to a mechanical null position off of the longitudinal axis of the housing and thus away from the mechanical null position. Means responsive to changes in position of the shaft from the electrical null position give an output to drive a control apparatus to correspond to changes in position of the probe as it tracks the seam, represented by changes in position of the shaft.

14 Claims, 5 Drawing Figures

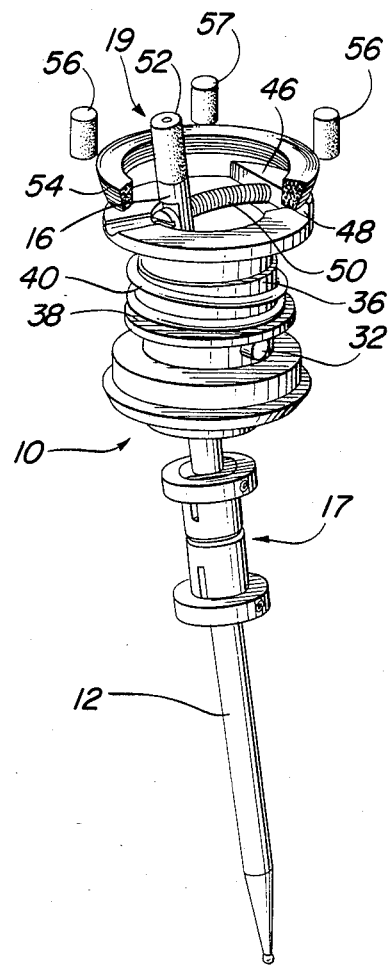
FIG. 1
FIG. 3
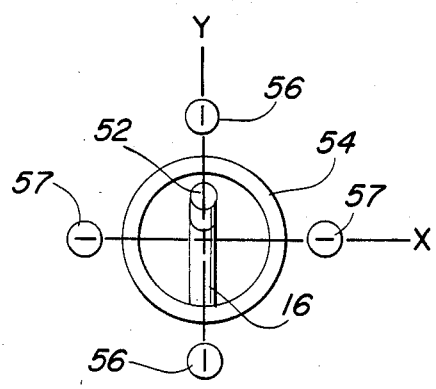
FIG. 4
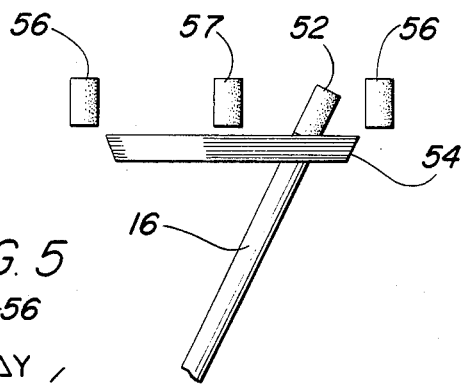
FIG. 5
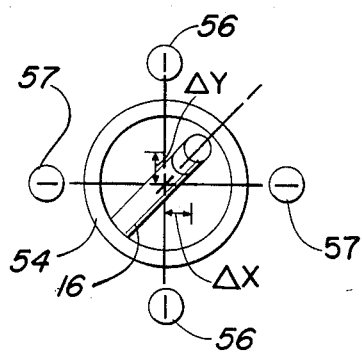

SEAM TRACKER

FIELD OF THE INVENTION

The present invention relates to seam trackers which are included on a welding machine and have a probe which follows the seam or joint to be welded and which includes apparatus for changing the position of the welding head of the welding machine in response to movement of the seam tracker probe.

BACKGROUND OF THE INVENTION

This invention relates generally to a novel seam tracker apparatus. More particularly, this invention is a seam tracker apparatus including a novel and improved means of biasing the seam tracker probe to a selected mechanical null position, and a novel and improved means of detecting the variation of the seam tracker probe from an electrical null position.

In the past, it has been common to employ seam trackers which contain a probe which is disposed in a seam or joint to be welded and which responds to displacement of the seam tracker probe in either of two directions, horizontally, or vertically. As is known, this is done as the seam tracker probe moves, for example, within the seam or in abutment to the joint being welded, in order that the seam tracker apparatus may produce an output signal representative of the change of the position of the probe, horizontally or vertically. This output signal (or signals) is employed to modify accordingly the change of position of the welding head such that the welding head remains properly oriented with the seam or joint to ensure proper welding. While such arrangements have exhibited at least a degree of utility in maintaining the welding head in its proper orientation, room for a significant improvement remains.

A welding apparatus containing a seam tracker generally of the type disclosed in the present application is shown in the patent to Cecil et al., U.S. Pat. No. 3,997,757, issued on Dec. 14, 1976. The seam tracker disclosed therein contains a probe which is connected to a shaft extending through a generally cylindrical seam tracker housing (as disclosed to be of a type illustrated in the patent to Morehead, U.S. Pat. No. 3,171,012). The null point of the probe in the Morehead patent, as described in the Cecil patent is along the longitudinal axis of the seam tracker housing. The means for biasing the shaft to the null point consists of a flange on the shaft which is urged against a seat by a coiled spring disposed between the shaft flange and a collar mounted on the interior portion of the housing. Such an arrangement contains problems both in ensuring that the shaft is urged back to its proper null position (which is both a mechanical and electrical null position) when pressure is removed from the probe, and also in allowing slippage of the flange on a seating collar, such that excessive pressure on the probe may distort the orientation of the flange to the seating collar and produce an improper position of the other end of the shaft which contains a means for sensing the position of that other end of the shaft in order to determine the location of the probe with respect to the null position. Moreover, the pressure of the coil spring at various points around the circumference of the portion of the coiled spring abutting the flange will tend to be irregular, so that return to the null point or urging of the shaft back toward the null point as the position of the seam changes may not be totally accurate. Thus, improper indications of the exact position of the probe with respect to the null position may result.

In addition, the means for determining the position of the other end of the shaft with respect to the null position as shown in the Cecil patent is a pair or orthogonally oriented magnets associated with, respectively, a Hall effect generator. This arrangement, and particularly the use of bar magnets, as the position indicating elements, which bar magnets move in curved paths with respect to the respective stationary Hall effect generators results in certain inaccuracies which the applicants have endeavored to eliminate.

The problems enumerated in the foregoing are not intended to be exhaustive, but rather are among many which tend to impair the effectiveness of previously known seam trackers. Other noteworthy problems may also exist; however, those presented should be sufficient to indicate that seam trackers appearing in the prior art have not been altogether satisfactory.

SUMMARY OF THE INVENTION

Recognizing the need for an improved seam tracker, it is, therefore, a general object of the present invention to provide a novel and improved seam tracker which minimizes or reduces the problems of the type previously noted.

It is a more particular feature of the present invention to provide a seam tracker which includes a structure which positively biases the seam tracker to a mechanical null position, and, moreover, in which the null position may be selected to be with the shaft of the seam tracker in other than alignment to the longitudinal axis of the seam tracker housing, which is the electrical null position.

It is another feature of the present invention to provide a novel and improved seam tracker in which the position of the seam tracker probe is determined based upon the change in magnetic coupling between a primary coil and each coil of two orthogonally mounted pairs of coils, due to the displacement of a ferromagnetic coupling contained on the end of the seam tracker shaft opposite from the end connected to the probe.

Examples of the more important features of the present invention have been summarized rather broadly in order that the detailed description thereof that follows may be better understood, and in order that the contribution to the art may be better appreciated. There are, of course, additional features of the invention which will be described hereinafter and which will also form the subject of the appended claims. These other features and advantages of the present invention will become apparent with reference to the following detailed description of the preferred embodiments thereof in connection with the accompanying drawings, wherein like reference numerals have been applied to like elements, in which:

BRIEF DESCRIPTION OF THE DRAWINGS

FIG. 1 depicts a perspective view of a preferred embodiment of the present invention showing the seam tracker of the present invention with the housing thereof removed and illustrating the mounting unit of the present invention;

FIG. 3 is a schematic enlarged plan view of the primary and secondary coils of the present invention and the relationship of the ferromagnetic end of the seam tracker shaft to those coils;

FIG. 4 is a side view of the schematic view of FIG. 3; and

FIG. 5 is the plan view of FIG. 3, showing displacement of the ferromagnetic end of the seam tracker shaft with respect to a selected electrical null position.

DETAILED DESCRIPTION OF A PREFERRED EMBODIMENT OF THE INVENTION

Figure 2:
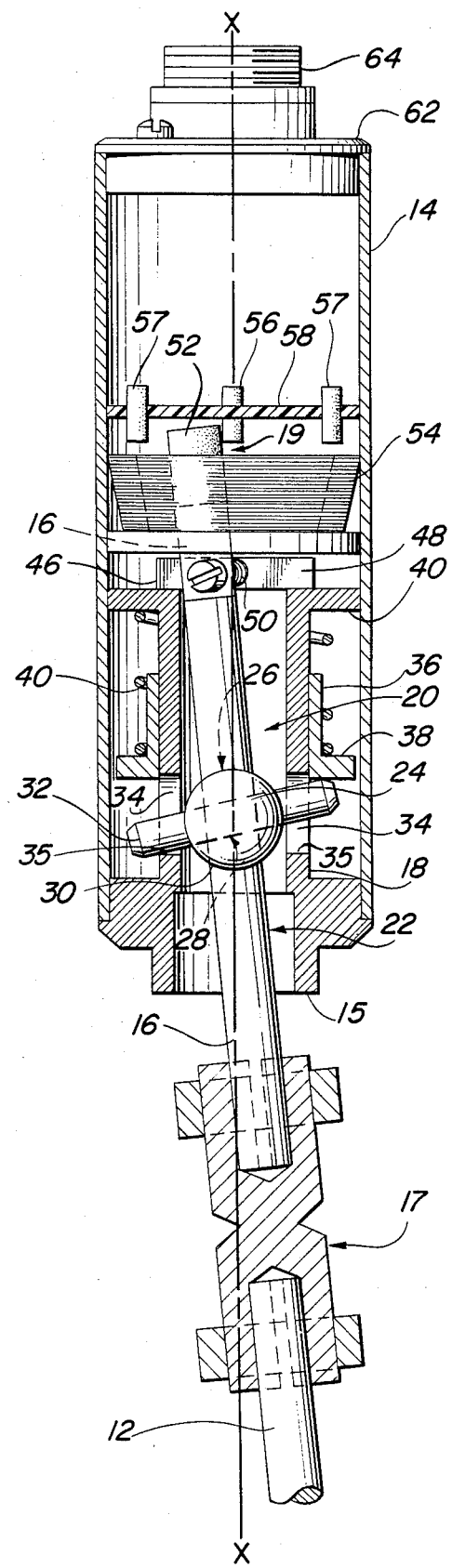
FIG. 2 is a partial cross-section of the seam tracker of the present invention as shown in FIG. 1 in which the housing and mounting unit are shown in cross-section

Turning first to FIGS. 1 and 2, there is shown a perspective and a cross-sectional view of a preferred embodiment of the present invention. FIGS. 1 and 2 show a seam tracker generally designated as 10 having a probe 12. The seam tracker includes a housing 14 which is symmetrically arranged around a longitudinal axis X—X as is shown in FIG. 2. The seam tracker 10 has a shaft 16 which is connected by a coupling 17 to the probe 12. The shaft 16 extends into a seam tracker mounting unit 18 (FIG. 2) which contains an open ended generally cylindrical interior opening 20 through which the shaft 16 passes. The shaft 16 includes an upper end generally indicated at 19 which follows the movements of the probe 12 as the probe moves along the seam of the workpiece to be welded. The seam tracker housing 14 is removed from the view of FIG. 1 for illustrative purposes.

As seen in FIG. 2, the end of the interior opening 20 facing the probe 12 and coupling 17, has a region 22 adjacent the lower end 15 of the housing, which is of increased diameter over the interior diameter of the generally cylindrical interior opening 20.

Disposed within the interior opening 20 is a ball joint 24 having an outer diameter generally equal to the inner diameter of the cylindrical opening 20. The ball joint has an interior passage 26 through which the shaft 16 passes. At right angles to this interior passage 26 in the ball joint 24 is another passage 28 through which extends a pin 32. The pin 32 also passes through a passage in the shaft 16, with the pin 32 having an outer diameter smaller than the outer diameter of the shaft 16. The pin 32 extends on either side of the ball joint 24 and is slidably engaged within opposed slots 34 cut in the walls of the mounting unit 18. The ends of the pin 32 are resiliently urged into abutment with the lower ends 35 of the slots 34 by a sleeve 36 which is slidably mounted on the exterior of the mounting unit 18. The sleeve 36 contains a flange 38 for engaging a coil spring 40 which is compressed between a flange 41 of the mounting unit 18 and the flange 38. The spring 40 forces the flange 38 against the protuding ends of the pin 32. Thus, each end of the pin 32 is resiliently urged into abutment with an end 35 of the slot 34 closest to the probe 12.

The flange 41 has an outer diameter generally equal to the inner diameter of the housing 14, and serves to position the mounting unit 18 with its longitudinal axis corresponding to the longitudinal axis of the housing 14. The flange 40 has a protrusion 46 which contains a connecting surface 48 to which is connected a coil spring 50, the opposite end of which is connected to the shaft 16. See FIG. 1. The connecting point of the spring 50 on the connecting surface 48 is aligned with the center line of the shaft 16 such that the spring 50 resiliently urges the shaft to pivot about the pin 32. When the probe 12 is removed from the workpiece the spring 50 urges the upper end 19 of the shaft into a mechanical null position at its fullest extent of allowable movement within the housing unit 14 in a direction perpendicular to the surface 48 as is illustrated in FIG. 1. The shaft 16 and the ball joint 30 are also rotatable or pivotable in a direction perpendicular to the axis of the pin 32 as is illustrated in FIG. 2. The ends of the shaft 16 thus have two degrees of freedom in a plane substantially perpendicular to the longitudinal axis X—X of the housing 14. When the shaft and ball joint 30 are rotated about an axis perpendicular to the longitudinal axis of the pin 32, such that one or the other end of the pin 32 is displaced away from the lower ends 35 of the associated slots 34, the spring 50 still urges the shaft 16 to a position of fullest allowable extent of travel away from the surface 48 of the protrusion 46. The spring 50 as shown is compressed when the shaft 16 moves out of the mechanical null position and towards the surface 48. It will be understood also that the spring 50 could just as easily be such as to be under tension when the shaft 16 is moved out of the mechanical null position.

The terminal end of the shaft 16 within the housing 14 is formed of a ferromagnetic material 52. A primary coil 54 is formed by a number of turns or wire wound on a spool-like member attached to the housing 14. The primary coil 54 surrounds an opening through which the ferromagnetic material 52 at the upper end of the shaft 16 extends. The inner diameter of the opening is of sufficient size that the ferromagnetic material 52 on the end of the shaft 16 will not contact the primary coil 54 when moved to its maximum allowable extent in any direction.

The housing 14 also contains on the interior thereof a mounting plate 58 made of suitable insulative material on which are mounted two opposing pairs of secondary coils 56 and 57, each consisting of a number of turns of wire. The mounting plate 58 electrically isolates the secondary coils from each other and the housing 14. The first pair of the secondary coils 56 have longitudinal axes arranged in a first plane through which the core 52 passes as the shaft 16 pivots about the axis of the pin 32. The second pair of secondary coils 57 have longitudinal axes arranged in a second plane orthogonal to the first plane and through which the core 52 passes when the shaft 16 pivots about an axis perpendicular to the longitudinal axis of the pin 32 as shown.

The seam tracker 10 may be coupled to the welding head (not shown) by means of an end cap 62 which is provided with external threads 64 on the upper end thereof as shown. The end cap 62 is suitably secured to the upper end of the housing 14 by a weld or any other suitable means.

The operation of the sensing portion of the seam tracker of the present invention may be understood by reference to FIGS. 3, 4 and 5. In FIG. 3, a plan view which is drawn out of scale and schematic in nature shows the primary coil 54 and secondary coils 56 and 57 with the shaft 16 and ferromagnetic end 52 shown disposed within the interior of the primary coil 54. FIG. 3 illustrates the mechanical null position with the shaft 16 and ferromagnetic end 52 lying in the first plane arbitrarily defined as the Y axis in the view of FIG. 3, and displaced away from the second plane, arbitrarily defined as the X axis in the view of FIG. 3, due to the urging of the spring 50. It will be seen by reference to FIG. 2 that the ferromagnetic material 52 extends above the top of the primary coil 54 and into close proximity with the secondary coils 56 and 57. The ferromagnetic material 52 thus provides a magnetic coupling between the primary coil 54 and the secondary coils 56 and 57. When a current is passed through the primary coil 54, current is induced in the secondary coils 56 and 57 due to the magnetic coupling.

The secondary coils 56 and 57 may be connected to any suitable electrical apparatus for detecting this change in relative current, for example, a bridge circuit. Thus, the bridge circuit may be balanced with the ferromagnetic material at the electrical null point. The out-of-balance condition resulting from the movement of the ferromagnetic material 52 towards the secondary coil 56 at, e.g., the top of FIG. 3 is representative of the amount of displacement in the Y axis of the ferromagnetic material 52 away from the electrical null point. Similarly, the secondary coils 57 at the right and left of FIG. 3 may be connected to a bridge circuit, with the bridge circuit being balanced when the ferromagnetic material 52 centerline axis lies at the electrical null point or midway between the coils. Displacement of the ferromagnetic material 52 to the right or left of the plane in the Y axis, through the electrical null point, induces a higher current in the secondary coil 57 towards which the ferromagnetic material 52 is displaced, and a correspondingly lower current in the secondary coil 57 away from which the ferromagnetic material 52 is displaced, thus giving an indication of the amount of displacement to either side of the mechanical/electrical null plane in the Y axis.

As shown in FIG. 3, displacement of the ferromagnetic material 52 along the Y axis of FIG. 3 to the mechanical null position will induce a greater current in the secondary coil 56 at the top of FIG. 4 and a correspondingly lower current in the secondary coil 56 at the bottom of FIG. 4 than would be present with the ferromagnetic material 52 at the electrical null position.

It will be seen that when the seam tracker 10 of the present invention is electrically energized and the probe 12 is not in contact with the workpiece the shaft 16 and the ferromagnetic end 52 will be at the mechanical null position and out of the electrical null position. This induces an error signal to the control unit for the welding head which causes the welding head to move vertically downward to a position which drives the probe 12 on the shaft 16 into engagement with the workpiece and, further, to a point where the ferromagnetic material 52 moves to the electrical null position. At this point the welding head is properly positioned and subsequent movement of the probe 12 will result in corresponding movement of the welding head.

FIG. 5 shows an illustrative position of the ferromagnetic material as displaced away from the electrical null point, with the out-of-balance of the induced current in the secondary coils 56 at the top and bottom of FIG. 6 being representative of a ΔY displacement, and the out-of-balance of the induced current in the secondary coils 57 to the right and left in FIG. 6 being representative of a ΔX displacement. The signals representative of the ΔY and ΔX displacements may be used in any conventional manner, for example, that shown in the Cecil patent mentioned above.

SUMMARY OF THE ADVANTAGES AND SCOPE OF THE INVENTION

It will be seen that in constructing a seam tracker 10 according to the present invention certain advantages are obtained. The shaft 16 is urged to a mechanical null position by the dual action of the resilient urging of the pin 32 to the lower ends 39 of the slots 34 and, in addition, by the resilient urging of the spring 50 on the shaft 16. The spring 50 urges the shaft to a mechanical null point which is not on the longitudinal axis of the mounting unit 18. Rather it is to the full extent of allowable movement of the shaft toward or away from the connecting surface 48, depending on the kind of spring urging which is utilized with the spring 50.

With the mechanical null away from the electrical null, in a direction which will generate an error signal indicating the welding head is vertically displaced from its proper position, the seam tracker 10, when energized, will move the welding head to seek the electrical null position at which point the welding head is properly disposed adjacent the workpiece.

The foregoing description of the invention has been directed to the preferred embodiment in accordance with the requirements of the Patent Statutes and for the purposes of explanation and illustration. It will be apparent, however, to those skilled in the art that many modifications and changes in both the apparatus and method of the present invention may be made without departing from the scope and spirit of the invention. For example, the position-indicator-system could be modified to position the primary and secondary coils about some other portion of the shaft which contains the position-indicator-member, i.e., ferromagnetic material. For example, the primary and secondary coils could be positioned at the probe-end of the housing, with a corresponding section of the shaft composed of or surrounded by a ferromagnetic material. The primary and secondary coils could also be disposed within the interior of the cylindrical opening of the housing, with suitable stops to prevent unwanted contact by the shaft with the primary coil and/or secondary coils. Further, there may be more than two pairs of secondary coils, with, e.g., three or more electrical null planes, conveniently perhaps four or eight, for generating signals which can be used to determine changes in shaft position. Also, though the combination of the shaft mounting with a position indicating system using primary and secondary coils magnetically linked together has certain advantages, the shaft mounting means of the present invention could also be used with other means of indicating changes in shaft position.

These and other modifications will be apparent to those skilled in this art and it is the applicant's intention to cover in the appended claims all such modifications as fall within the spirit and scope of the invention.

What is claimed is:

1. A seam tracker comprising:
    a housing;
    a shaft having first and second ends with the first end thereof being connected to a seam-tracking probe;
    a ball joint between the shaft and the housing;
    a pair of slots in the housing;
    a pin mounting for the ball joint with the pin ends slidably engaged in a respective one of the slots;
    spring-operated means for urging the pin ends into abutment with an end of the respective one of the slots; and
    means carried by the housing for detecting the position of the first end of the shaft and generating an output signal representative of said position.

2. The apparatus of claim 1, wherein the spring operated means comprises:

a sleeve slidably mounted on the housing and having a flange which engages the respective pin ends; and a spring mounted between a flange on the housing and the flange on the sleeve.

3. The apparatus of Claim 2, further comprising:

a mechanical-null-position spring connected between the housing and the shaft and urging the shaft into a mechanical null position at its fullest allowable movement in a direction perpendicular to the axis of the pin and the longitudinal axis of the housing.

4. The apparatus of claim 3 wherein the means for detecting the position of the shaft comprises:

a position-indicator member mounted on the shaft; and a primary coil and a plurality of paired secondary coils which produce an output signal from respective pairs of the secondary coils representative of the change of the position-indicator member relative to an electrical null position of the position-indicator member, which is different from the mechanical null position, due to changes in the magnetic coupling between the primary coil and any of respective secondary coils of the pairs of secondary coils resulting from movement of the position-indicator member.

5. The apparatus of claim 2 wherein the means for detecting the position of the shaft comprises:

a position-indicator member mounted on the shaft; and a primary coil and a plurality of paired secondary coils which produce an output signal from respective pairs of the secondary coils representative of the change of the position-indicator member relative to an electrical null position of the position-indicator member, which is different from the mechanical null position, due to changes in the magnetic coupling between the primary coil and any of respective secondary coils of the pairs of secondary coils resulting from movement of the position-indicator member.

6. The apparatus of claim 1 further comprising:

a mechanical-null-position spring connected between the housing and the shaft and urging the upper end of the shaft into a position of its fullest allowable movement in a direction perpendicular to the axis of the pin and the longitudinal axis of the housing.

7. The apparatus of claim 6 wherein the means for detecting the position of the shaft comprises:

a position-indicator member mounted on the shaft; and a primary coil and a plurality of paired secondary coils which produce an output signal from respective pairs of the secondary coils representative of the change of the position-indicator member relative to an electrical null position of the position-indicator member, which is different from the mechanical null position, due to changes in the magnetic coupling between the primary coil and any of respective secondary coils of the pairs of secondary coils resulting from movement of the position-indicator member.

8. The apparatus of claim 1 wherein the means for detecting the position of the shaft comprises:

a position-indicator member mounted on the shaft; and a primary coil and a plurality of paired secondary coils which produce an output signal from respective pairs of the secondary coils representative of the change of the position-indicator member relative to an electrical null position of the position-indicator member, which is different from the mechanical null position, due to changes in the magnetic coupling between the primary coil and any of respective secondary coils of the pairs of secondary coils resulting from movement of the position-indicator member.

9. In a welding machine having a seam tracking apparatus, having a probe to be positioned in, and responsive to relative movement respective to the probe of, a welding zone, and a control apparatus for modifying the position of a welding head responsive to an output signal from the seam tracking apparatus, an improved apparatus for generating the output signal responsive to the movement of the probe in either of two possible degrees of freedom, comprising:

a seam tracker housing;

a seam tracker mounting unit disposed within the housing and having a longitudinal axis, and having an open ended interior opening of generally cylindrical shape with a longitudinal axis corresponding to that of the mounting unit, and having a flange at one end of the mounting unit;

a shaft connected to the probe at one end thereof and extending through one end of the interior opening and through the length of the interior opening, with the end of the shaft disposed at the other end of the interior opening forming a position-indicator member;

a ball joint disposed in the interior opening intermediate the one end and the other end of the interior opening, and having an interior passage through which the shaft is engageably passed, and having a pin with the opposing exterior ends of the pin extending from the surface of the ball joint;

a pair of opposed slots on the mounting unit each disposed to receive a respective end of the pin, thereby locking the ball joint to a first degree of motion within the interior opening, about the longitudinal axis of the pin; and a sleeve slidably disposed on the outside of the mounting unit and having a flange, with a spring positioned between the flange of the mounting unit and the flange of the sleeve, to thereby urge the flange of the sleeve into abutment with the respective ends of the pin.

10. The apparatus of claim 9, further comprising:

a primary coil disposed within the housing at generally the one end of the mounting unit, and having an interior opening with an inner diameter of sufficient size to allow the position-indicator member to move with the shaft to the full extent of the permissible shaft motion, without contacting the primary coil; and a plurality of secondary coils each disposed within the housing and positioned such that a first pair of secondary coils each has a longitudinal axis in a first electrical null plane and a second pair of secondary coils each has a longitudinal axis in a second electrical null plane orthogonal to the first axis null plane, with the intersection of the first and second electrical null planes forming an electrical null point different from the mechanical null point.

11. A seam tracker including a probe for following a seam in a work piece to be welded comprising:

a housing having a longitudinal axis, an upper end, and a lower end and defining guide means;

a shaft connected to the seam-tracking probe;

means for mounting the shaft intermediate its length in the housing guide means so that the shaft ends have two degrees of freedom in a plane at right angles to the longitudinal axis of the housing and first bias means coupled between the shaft and the housing, the bias means, guide means and the mounting means being constructed and arranged to resiliently urge the shaft so that the upper end of the shaft will always return to a first predetermined null position along one of its degrees of freedom when the probe is not contacting the work piece;

a position-indicator member mounted on the shaft; and a primary coil and a plurality of paired secondary coils which produce an output signal from respective pairs of the secondary coils representative of the change of the position-indicator member relative to an electrical null position of the position-indicator member, which is different from the mechanical null position, due to changes in the magnetic coupling between the primary coil and any of respective secondary coils of the pairs of secondary coils resulting from movement of the position-indicator member.

12. The seam tracker of claim 11 including second bias means coupled between the housing and the shaft to urge the upper end of the shaft to a second predetermined null position along its other degree of freedom when the probe is not contacting the work piece.

13. The seam tracker of claim 12 wherein the guide means comprises a pair of slots in the housing aligned with the longitudinal axis thereof and the mounting means for the shaft comprises a pin extending into the slots.

14. The seam tracker of claim 13 wherein the first bias means comprises a first spring connected between the housing and the shaft for urging the pin ends against the lower ends of the slots and the second bias means comprises a second spring connected between the housing and the shaft for urging the upper end of the shaft towards its limit of travel in a direction at right angles to the axis of the pin.

* * * * *